(12) United States Patent
Schopf et al.

(10) Patent No.: US 8,361,528 B2
(45) Date of Patent: Jan. 29, 2013

(54) FLAKE CEREAL OR CHIP AND METHOD FOR MAKING SAME

(75) Inventors: Larry Donald Schopf, Madison, WI (US); Bryan Jarel Streety, Salem, OR (US); Guru Hari Singh Khalsa, Eugene, OR (US); Peter Hynding Mattson, Hillsborough, CA (US)

(73) Assignee: Hearthside Food Solutions LLC, Downers Grove, IL (US)

( * ) Notice: Subject to any disclaimer, the term of this patent is extended or adjusted under 35 U.S.C. 154(b) by 175 days.

(21) Appl. No.: 12/021,661

(22) Filed: Jan. 29, 2008

(65) Prior Publication Data
US 2008/0181991 A1   Jul. 31, 2008

Related U.S. Application Data

(60) Provisional application No. 60/887,113, filed on Jan. 29, 2007.

(51) Int. Cl.
  *A23L 1/216* (2006.01)
  *A23L 1/10* (2006.01)
(52) U.S. Cl. .......... 426/96; 426/457
(58) Field of Classification Search .......... 426/96, 426/103, 99, 453, 457, 463, 516, 519
See application file for complete search history.

(56) References Cited

U.S. PATENT DOCUMENTS

| | | | |
|---|---|---|---|
| 2,998,317 A | 8/1961 | Reesman | |
| 3,121,637 A | 2/1964 | Clausi et al. | |
| 4,211,800 A * | 7/1980 | Scharschmidt et al. | 426/93 |
| 4,698,000 A * | 10/1987 | Thulin et al. | 425/133.1 |
| 5,372,826 A | 12/1994 | Holtz et al. | |
| 5,510,130 A | 4/1996 | Holtz et al. | |
| 6,800,310 B2 * | 10/2004 | Squire et al. | 426/96 |
| 2001/0051198 A1 * | 12/2001 | Robie et al. | 426/96 |

FOREIGN PATENT DOCUMENTS

GB   1561190   * 2/1980

OTHER PUBLICATIONS

Fast, Robert B., "Manufacturing Technology of Ready-to-Eat Cereals;" Breakfast Cereals and How They Are Made, Chapter Two; Second Edition, p. 17-31, American Association of Cereal Chemists, Inc., St. Paul, MN, USA; Mar. 1990.

* cited by examiner

*Primary Examiner* — Larry Tarazano
*Assistant Examiner* — Katherine Deguire
(74) *Attorney, Agent, or Firm* — Schwabe Williamson & Wyatt

(57) ABSTRACT

Embodiments of the present invention provide a flake having a high level of whole grains, such as oat groats, nuts and/or other particulate. An embodiment of the present invention provides a flake having a low degree of degradation giving the flake a granola appearance and texture, a relatively large thickness of the flake, which further contributes to the appearance and the crunchy texture, and/or uses a low degree of cook to the binding constituent that provides the high viscosity for binding and a resultant crunchy texture.

16 Claims, 1 Drawing Sheet

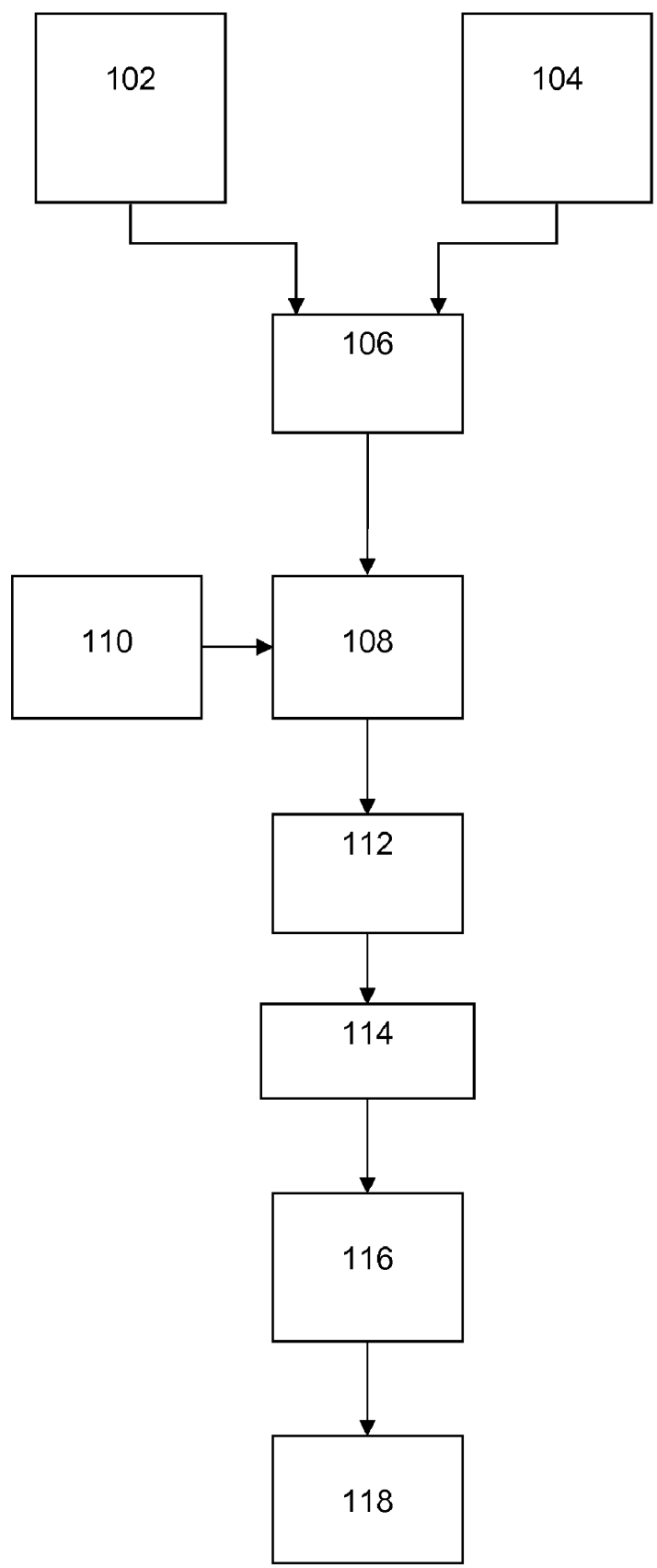

FLAKE CEREAL OR CHIP AND METHOD FOR MAKING SAME

CROSS REFERENCE TO RELATED APPLICATIONS

The present application claims priority to U.S. Provisional Patent Application No. 60/887,113, filed Jan. 29, 2007, entitled "Granola Flake Cereal or Chip and Method for Making Same," the entire disclosure of which is hereby incorporated by reference in its entirety.

TECHNICAL FIELD

Embodiments of the present invention relate to the field of food products and food processing, and, more specifically, to a flake cereal or snack chip and a method for making the same.

BACKGROUND

Breakfast cereals utilize many different types of grains as well as other ingredients and utilize many different forms including shredded, puffed, flaked, toasted and granular particles. These forms may be found in hot cereals, dry cereals, granola cereals and others.

One primary goal in developing a new cereal product is to produce a product that is desirable to consumers. Desirability of a product may be based on factors such as taste, texture, color, and particle shape/size. Another factor of importance is the ability to maintain particle integrity when the particle is re-hydrated, for example when milk is added to the cereal.

BRIEF DESCRIPTION OF THE DRAWINGS

Embodiments of the present invention will be readily understood by the following detailed description in conjunction with the accompanying drawings. Embodiments of the invention are illustrated by way of example and not by way of limitation in the figures of the accompanying drawings.

FIG. 1 is a flowchart of an exemplary method of producing a flake in accordance with various embodiments of the present invention.

DETAILED DESCRIPTION OF EMBODIMENTS OF THE INVENTION

In the following detailed description, reference is made to the accompanying drawings which form a part hereof, and in which are shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

In various embodiments of the present invention, methods, apparatuses, and systems for producing a flake cereal or snack chip are provided.

In an embodiment, methods, apparatuses, and systems for producing a granola flake cereal or snack chip are provided. For the purposes of the present invention, the term "granola flake" refers to a food product in the form of a relatively thick flake, such as approximately 0.030-0.080 inch thick, having the texture and appearance of conventional granola, whether in the form of a breakfast cereal or a snack chip.

An embodiment of the present invention provides a granola flake having a high level of whole oat groats, nuts and/or other particulate. An embodiment of the present invention provides a flake having a low degree of degradation giving the flake the "granola" appearance and texture. An embodiment provides a high thickness of the flakes, which further contributes to the "granola" appearance and the crunchy texture. An embodiment provides a relatively low degree of cook to the binding constituent that provides the high viscosity for binding and a resultant crunchy texture. Cereal flakes (or snack chips) other than granola flakes may be made in accordance with embodiments of the present invention by changing the ingredients utilized.

A flake in accordance with an embodiment of the present invention maintains its integrity and texture through processing and when liquid, such as milk, is introduced for consumption. An embodiment provides a very crunchy texture and long bowl life of the finished flakes in milk. For the purposes of the present invention, the term "bowl life" refers to the length of time the flake maintains substantial integrity when combined in a bowl with a liquid, such as milk. In addition, such a flake maintains its particle integrity during packaging and shipping.

An embodiment of the present invention provides a flaked, ready-to-eat breakfast cereal with the appearance, texture and flavor of granola. Due to the characteristics of the flake, an embodiment of the present invention may also be provided as a snack chip. For the purposes of the present invention, the term "granola" generally refers to a food product consisting of a mixture of grains, nuts, and/or other ingredients, such as honey, fruit, etc. Such a mixture is generally baked until crispy.

Embodiments of the present invention produce a flake that is thicker than normal cereal flakes and with visual, integral, undegraded whole grain particulate in the flake to give it a granola appearance. In an embodiment, the resulting flake also achieves the desirable extended bowl life of 3-5 times that of traditional cereal flakes. These results may be accomplished by a low cook level of the binder in the presence of the particulate that has experienced a low level of attrition in the process to form a flake thicker than traditional cereal flakes. In comparison to traditional cereal flake processes, a flake made of the binder without the particulate and at the low degree of cook and the greater thickness would be very hard and crunchy. In accordance with an embodiment of the invention, the presence of the particulate in this low cooked, thick flake weakens and interferes with the crystal structure of the binder sufficiently to soften the texture of the flake to the desired texture and bowl life. Alternatively, if the binder were cooked to the higher level of traditional flakes, the crystal structure of the binder would be weaker and the binder may not hold the particulate in the flake sufficiently and the flake with the particulate would have a softer texture and shorter bowl life than traditional cereals. Further, in embodiments, the use of various binders, sweeteners, nuts, pregelatinized starch, etc. and/or the level of particulate affect the degree of energy input necessary to create the desired crystal structure, appearance and flake strength.

An embodiment of the present invention uses oat groats (hulled oats) or other whole grains (oats (in other forms), wheat, bran, corn, rice, barley, etc.) or nuts (pecans, almonds, walnuts, cashews, etc.) in combination with a binder of rice flour/starch, wheat flour/gluten or other starch or protein source. In an embodiment, other ingredients may be added to the mixture including sugar (such as in the form of granulated sugar, raw sugar, brown sugar, evaporated cane juice) or an artificial sweetener, salt (such as sea salt), honey, oil (such as canola oil, vegetable oil, or cottonseed oil), fruit/berries (for example, pieces of dried fruit or berries), raisins, seeds, flavorings (such as vanilla flavor), or spices (such as cinnamon), etc.

In an embodiment, a method of preparing a flake is provided utilizing a cook level that provides sufficient binding of the whole grains and a texture crispier and crunchier than conventional cereal flakes. In an embodiment, a suitable cook level may be one that utilizes an energy input of 0.015 horsepower or more, such as approximately 0.030-0.075 horsepower, per pound of binder per hour at an extrudate moisture content of approximately 25-40%. In embodiments, the energy may be imparted by mechanical and/or thermal energy. In an embodiment, the oat groats or other whole grains (singularly or in combination) may be heat treated (kilned), and may, in an embodiment, be treated with a preservative (such as natural tocopherols) to provide suitable flavor and shelf stability of a ready-to-eat cereal. In an embodiment, an oat groat or other whole grain that is not heat treated may be used, however, in such an embodiment, it may be beneficial to treat the finished product (or an intermediate product thereof) with a preservative and/or package the final product sufficiently to preserve freshness. The texture of a finished flake in accordance with an embodiment of the invention is such that when served in milk as a standard ready-to-eat breakfast cereal, the flakes have a bowl life (i.e., retain their crisp texture) of 10-15 minutes or more, or 3-4 times longer than conventional flaked cereals.

An embodiment of the present invention as shown in FIG. 1 provides a process for producing a granola flake. In an embodiment, a whole grain particulate (such as oat groats) may be heat treated 102 and blended 106 with a binder 104. In an embodiment, the whole grains may be heat treated for a period of approximately 1-60 minutes, such as approximately 25 minutes, at a temperature of 100-500° F., such as approximately 250° F. In an embodiment, the blended ingredients may be fed into an extruder 108, such as a low shear twin screw extruder, or other low shear extruder.

In embodiments, the particulate may be blended with the binder 104 before being introduced into extruder 108, or the ingredients may be separately introduced into extruder 108 and then blended in extruder 108.

In embodiments, all or part of the binder may be used in a pregelatinized form of rice flour, corn flour, wheat flour, or other starch resulting in an increase in production rates and/or the ability to produce the flakes on larger extruders. Pregelatinization is a process of precooking the starch using drum drying, extrusion, or other methods. Thus, in an embodiment, binder 104 may be pregelatinized and provided in that form when blended with the whole grain particulate.

In an embodiment, at the blending stage or when fed into the extruder, other ingredients (110) may be included, such as nuts, sugar/sweetener, salt, flavorings, etc. In an embodiment, the other ingredients 110 may comprise a liquid syrup blend of sugar/sweetener, honey, salt, and/or flavoring, etc. In an embodiment, the particulate portion of the blend should be 15%-70%, such as 40-60% or more, such as greater than 50%, on a dry weight basis of the resultant extrudate, in order to provide the desired look of the finished flakes. In an embodiment, the particulate or mixture thereof selected may impact the characteristics of the finished flake, and thus may drive the percentage of particulate utilized. For example, some particulates, such as wheat, tend to break into smaller pieces during the flaking process and thus may be used at higher levels to achieve the desired characteristics, whereas some other particulates, such as oats, retain substantial integrity through the flaking process and thus may be used at lower levels while still achieving the desired characteristics.

In an embodiment, the blend may be cooked in a low shear extruder 108 to prevent degradation of the particulate. Further, in an embodiment, a low degree of cook may be provided to the binder (starch and protein) so that the resultant material has a high viscosity necessary for binding the particulate and to provide a texture crunchier than standard cereal flakes.

In an embodiment, the extrudate may be cut into pellets and fed to flaking rolls 112 that are selected to flake the cereal to 0.030-0.080 inch thick flakes. In an embodiment, the flakes may be produced with a greater than 0.030 inch thickness, for example approximately 0.040-0.060 inch thick. In accordance with an embodiment of the present invention, thicker flakes comprised of suitable agreements may retain the granola appearance and add to the crunchy texture. If made at this thickness, standard flakes of corn, bran, oat, etc. would be hard and glassy, and thus, generally possess an unpleasant texture. The ingredients and process according to embodiments of the present invention, such as the percentages of particulate and starch/protein, as well as the low cook level, allow for the production of thicker flakes with desirable texture. In an embodiment, even thicker flakes may be produced using processes described herein, such as flakes greater than 0.080 inch thick. In such situations, in an embodiment, it may be useful to select binders that puff somewhat during the cooking process to soften the harder texture resulting from the thicker flakes.

In an embodiment, a flake may be formed that is approximately 0.2 to 2.0 inches in diameter. While the flakes may have a variety of shapes and may be regular or irregular in shape, for the purposes of describing embodiments of the present invention, the term "diameter" refers roughly to the long dimension of the flake (whether or not the flake exhibits a round, square, rectangular, or other profile) which gives a sense of relative size of the flake.

In an embodiment, the resultant flakes may be toasted and dried in a typical fluid bed dryer 114 at temperatures of 350-500° F. for approximately 1 to 5 minutes. In an embodiment, drying the flakes to moisture levels above 5% reduces the desirability of preservatives or special packaging to preserve freshness. In an alternative embodiment, flakes may be dried to less than 5%, however, the use of preservatives and/or special packaging may be beneficial in such a situation.

In an embodiment, dried flakes may be coated 116 with a sugar/sweetener, flavoring, and/or oil to improve flavor, sweetness and/or bowl life.

In an embodiment, whether coated or not, flakes may dried 118 to finished moisture for packaging.

In an embodiment, an exemplary dry feed formula may comprise 60-80% by weight, such as approximately 71%, oat groats (or other whole grain source), 10-30% by weight, such as approximately 20%, rice flour (or other binder), and 5-15% by weight, such as approximately 9%, pecans (or other nuts).

In an embodiment, an exemplary final flake may comprise 40-60% by weight, such as approximately 49%, oat groats (or other whole grain source), 10-20% by weight, such as approximately 14%, rice flour (or other binder), and 1-10% by weight, such as approximately 6%, pecans (or other nuts), 20-30% by weight, such as approximately 24%, evaporated cane juice (or other sugar or sweetener), approximately 3% honey or less, approximately 0.5% vanilla flavoring or less, approximately 0.2% salt (such as sea salt) or less, and approximately 2-6%, such as approximately 4%, canola oil (or other oil).

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method for producing a flake, comprising:
   introducing undegraded whole grain groats and a binder into a low shear extruder in the form of a blend or blending the undegraded whole grain groats and the binder in the low shear extruder;
   cooking the blend in the low shear extruder to gelatinize the binder to form an extrudate, wherein the extrudate comprises the undegraded whole grain groats;
   feeding the extrudate into rolls to form flakes by compressing the extrudate to a thickness of approximately 0.030 to 0.080 inch; and
   toasting and drying the flakes, wherein the flakes comprise rolled whole grain groats.

2. The method of claim 1, wherein said introducing undegraded whole grain groats and a binder into a low shear extruder comprises introducing undegraded whole grain groats and a binder into a low shear twin screw extruder.

3. The method of claim 1, further comprising introducing additional ingredients into the low shear extruder along with or separate from the undegraded whole grain groats and the binder, said additional ingredients being one or more of nuts, sugar, sweetener, honey, salt, and flavoring.

4. The method of claim 1, wherein the undegraded whole grain groats in the blend comprise approximately 15-70%, and the binder in the blend comprises approximately 10-20%, on a dry weight basis of the extrudate.

5. The method of claim 1, wherein said feeding the extrudate into rolls comprises cutting the extrudate into pellets and feeding the pellets into flaking rolls to compress and form flakes approximately 0.030 to 0.080 inch thick.

6. The method of claim 1, wherein said toasting and drying is performed at temperatures of 350-500° F. for approximately 1 to 5 minutes.

7. The method of claim 1, wherein said toasting and drying is continued until the flakes comprise moisture levels of approximately 5% or more.

8. The method of claim 1, wherein said toasting and drying is continued until the flakes comprise moisture levels approximately 5% or less.

9. The method of claim 1, further comprising coating the dried flakes with at least one of a sugar, sweetener, flavoring, and oil.

10. The method of claim 1, further comprising, prior to blending said undegraded whole grain groats with said binder, heat treating said undegraded whole grain groats for approximately 1 to 60 minutes at a temperature from approximately 100° F. to approximately 500° F.

11. The method of claim 1, further comprising, prior to blending said undegraded whole grain groats with said binder, cooking said binder to form a pregelatinized binder.

12. The method of claim 1, wherein the blend is cooked in the low shear extruder so that the binder is cooked to a suitable cook level to gelatinize the binder, said suitable cook level being one that utilizes an energy input of approximately 0.030-0.075 horsepower per pound of the binder per hour with an extrudate moisture content of approximately 25-40%.

13. The method of claim 1, wherein the blend is cooked in the low shear extruder so that the binder is cooked to a suitable cook level to gelatinize the binder, said suitable cook level being one that utilizes an energy input of approximately 0.015 or more horsepower per pound of the binder per hour with an extrudate moisture content of approximately 25-40%.

14. A method for producing a flake, comprising:
   introducing undegraded whole grain groats and a binder into a low shear extruder in the form of a blend or blending the undegraded whole grain groats and the binder in the low shear extruder;
   cooking the blend in the low shear extruder to gelatinize the binder to form an extrudate, wherein the extrudate comprises the undegraded whole grain groats;
   forming flakes from the extrudate, wherein forming flakes consists of feeding the extrudate into rolls and compressing the extrudate to a thickness of approximately 0.030 to 0.080 inch; and
   toasting and drying the flakes, wherein the flakes comprise rolled whole grain groats.

15. The method of claim 14, wherein the binder is not pregelatinized, and wherein the binder is gelatinized during cooking of the blend of undegraded whole grain groats and binder.

16. The method of claim 1, wherein said undegraded, whole grain groats comprise undegraded, hulled, rolled whole grain groats.

* * * * *